United States Patent [19]

Sarkar et al.

[11] Patent Number: 5,500,457
[45] Date of Patent: Mar. 19, 1996

[54] WATER BASED TONER RECEPTIVE CORE/SHELL LATEX COMPOSITIONS

[75] Inventors: Manisha Sarkar, Austin, Tex.; Ying-Yuh Lu, Woodbury, Minn.

[73] Assignee: Minnesota Mining and Manufacturing Company, St. Paul, Minn.

[21] Appl. No.: 342,158

[22] Filed: Nov. 18, 1994

[51] Int. Cl.$^6$ .......... C08F 267/02; C08L 51/00; C08L 33/08; C08L 33/10
[52] U.S. Cl. .......... 523/201; 524/504; 525/81; 525/82; 525/85; 525/902
[58] Field of Search .......... 523/201; 524/504; 525/81, 82, 85, 902

[56] References Cited

U.S. PATENT DOCUMENTS

| | | | |
|---|---|---|---|
| 4,480,003 | 10/1984 | Edwards et al. | 428/329 |
| 4,497,917 | 2/1985 | Upson et al. | 523/201 |
| 4,869,955 | 9/1989 | Ashcraft et al. | 428/327 |
| 4,891,285 | 1/1990 | Page et al. | 430/14 |
| 4,956,225 | 9/1990 | Malhotra | 428/216 |
| 5,026,782 | 6/1991 | Biale | 525/317 |
| 5,104,721 | 4/1992 | Sun | 428/206 |
| 5,104,731 | 4/1992 | Gager | 428/323 |
| 5,139,882 | 8/1992 | Elser et al. | 523/201 |
| 5,141,983 | 8/1992 | Hasegawa et al. | 524/457 |
| 5,147,940 | 9/1992 | Biale | 525/317 |
| 5,156,904 | 10/1992 | Rice et al. | 428/219 |
| 5,183,504 | 2/1993 | Kuwajima et al. | 106/404 |
| 5,208,211 | 5/1993 | Kurotori et al. | 503/227 |
| 5,212,008 | 5/1993 | Malhotra et al. | 428/216 |
| 5,212,273 | 5/1993 | Das et al. | 526/323.1 |
| 5,216,044 | 6/1993 | Hoshino et al. | 523/201 |
| 5,225,456 | 7/1993 | Langerbeins et al. | 523/201 |
| 5,229,188 | 7/1993 | Takeuchi et al. | 428/195 |
| 5,254,403 | 10/1993 | Malhotra | 428/323 |
| 5,266,383 | 11/1993 | Sakaki et al. | 428/195 |
| 5,289,245 | 2/1994 | Menjo | 355/284 |
| 5,308,389 | 5/1994 | Russo et al. | 427/385.5 |
| 5,308,890 | 5/1994 | Snyder | 525/902 |
| 5,310,591 | 5/1994 | Dodge et al. | 428/195 |
| 5,310,595 | 5/1994 | Ali et al. | 428/206 |
| 5,330,823 | 7/1994 | Malhotra | 428/195 |

FOREIGN PATENT DOCUMENTS 1289838A 11/1989 Japan .......... C08J 7/04

Primary Examiner—Peter A. Szekely
Attorney, Agent, or Firm—Gary L. Griswold; Walter N. Kirn; Darla P. Neaveill

[57] ABSTRACT

A water-based toner-receptive composition suitable for electrophotographic or xerographic imaging, comprising:

a) from about 65 to about 99 parts of a transparent film-forming core/shell latex polymer, wherein the ratio of core to shell of said core/shell latex polymer ranges from about 10/90 to about 90/10, with the core having a lower $T_g$ than the shell;

b) from about 1 to about 15 parts polymeric particles; and c) from 0 to about 20 parts of an antistatic agent selected from the group consisting of cationic agents, anionic agents, fluorinated agents, and nonionic agents.

8 Claims, No Drawings

WATER BASED TONER RECEPTIVE CORE/SHELL LATEX COMPOSITIONS

BACKGROUND OF THE INVENTION

1. Field of the Invention

This invention relates to transparent image recording materials suitable for use in xerographic and electrographic copying devices. Specifically, it relates to coatings for transparencies having specific physical properties for use in overhead projectors.

2. Description of the Art

Many different types of transparent image receptive sheets or receptors are known in the art. Typically, these transparent sheets are comprised of thin oriented films made from one or more organic resins such as polyesters, and overcoated with an image receptive layer on one major surface. Such sheets can be used as receptors in different printing and imaging methods such as thermal transfer printing, ink-jet printing and xerographic or electrographic copying, to produce transparencies suitable for use with commercially available overhead projectors.

In the formation and development of xerographic images, a toner composition comprised of resin particles and pigment particles is generally applied to a latent image generated on a photoconductive member. The image is then transferred to the image receptive sheet and affixed there by the application of heat, pressure, or a combination thereof.

Japanese Patent 1289838A discloses a composite polyester film having a cover layer comprising a concentration of sulfonic acid or sulfonate. The composite film is taught to eliminate "pile traveling" (simultaneous feeding of more than one sheet), and to yield excellent transparency flatness and toner adhesion.

U.S. Pat. No. 5,104,721 discloses a medium for electrophotographic printing or copying, especially laser electrophotography comprising a polymeric substrate coated with a polymeric coating having a Tukon hardness of about 0.5 to 5.0 and a glass transition temperature of about 5° to 45° C. The coating comprises at least one pigment which provides a coefficient of static friction of from 0.20 to 0.80 and a coefficient of dynamic friction of from 0.10 to 0.40. The polymer employed in the coating can contain thermosetting or thermoplastic resins, and preferably aqueous acrylic emulsions such as Rhoplex™ resins from Rohm and Haas. Improved image quality and toner adhesion is disclosed.

U.S. Pat. No. 5,104,731 discloses a dry toner imaging film media having good toner affinity, anti-static properties, embossing resistance and feedability through electrophotographic copiers and printers. The media comprises a polymeric substrate coated with an antistatic matrix layer. The matrix layer has blocking resistance at 78° C. after 30 minutes and a surface resistivity of from about $1\times10^8$ to about $1\times10^{14}$ ohms per square at 20° C. and 50% relative humidity. The matrix contains one or more thermoplastic polymers having a $T_g$ of 5° C. to 75° C., and at least one crosslinked polymer which is resistant to hot roll fuser embossing, at least one of the polymers being electrically conductive.

U.S. Pat. No. 4,480,003 discloses a transparency film for use in plain paper electrostatic copiers. A first surface of a flexible, transparent, heat resistant polymeric film is coated with an image receiving layer, preferably, a toner-receptive, thermoplastic, transparent polymethylmethacrylate polymer containing dispersed silica particles. The second major surface of the film base has a coating of non-migratory electrically conductive material, preferably a polymer derived from the reaction of pyridine and 2 amino-pyridine with partially chloromethylated polystyrene. A primer coating between the polymeric film base and the layer of conductive material is preferred to provide suitable adhesion. A protective coating to control abrasion, resistance, roughness and slip properties is also preferred. It is disclosed that the sheet can be fed smoothly from a stack and produces clear background areas.

U.S. Pat. No. 4,869,955 discloses an element suitable for preparing transparencies using an electrostatic plain paper copier. The element comprises a polyethylene terephthalate support, at least one subbing layer coated thereon and, thereover, a toner receptive layer comprising a mixture of an acrylate binder, a polymeric antistatic agent having carboxylic acid groups, crosslinking agent, butylmethacrylate modified polymethacrylate beads and submicron polyethylene beads.

U.S. Pat. No. 4,956,225 discloses a transparency suitable for electrographic and xerographic imaging comprising a polymeric substrate with a toner receptive coating on one surface thereof which comprises blends selected from a group consisting of: poly(ethylene oxide) and carboxymethyl cellulose; poly(ethylene oxide), carboxymethyl cellulose and hydroxypropyl cellulose; poly(ethylene oxide) and vinylidene fluoride/hexafluoropropylene copolymer; poly(chloroprene) and poly(alpha-methylstyrene); poly(caprolactone) and poly(alpha-methylstyrene); poly(vinyl isobutylether) and poly(alpha-methylstyrene); poly(caprolactone) and poly (α-methylstyrene); chlorinated poly(propylene) and poly(α-methylstyrene); chlorinated poly(ethylene) and poly(α-methylstyrene); and chlorinated rubber and poly (α-methylstyrene). Also disclosed are transparencies with first and second coating layers.

U.S. Pat. No. 5,229,188 discloses a transparent laminate film for full color imaging comprising two transparent resin layers. The first resin layer is heat-resistant, and the second resin layer must be compatible with a binder resin constituting the toner to be used for color image formation. The second resin layer has a larger elasticity than that of the binder resin of the toner at a fixing temperature of the toner. The second resin can be of the same "kind" i.e., type, e.g., styrene-type or polyester type, as the toner binder, as long as the resins differ in storage elasticity.

U.S. Pat. Nos. 5,026,782 and 5,147,940 disclose opaque polymer particles comprising a non-swellable core polymer, covered at least in part, by a shell polymer. The core polymer can be made of vinyl halide with a $T_g$ of at least 50° C. The polymer is disclosed for use in the manufacture of paints, paper coatings and films, especially latex binder compositions.

U.S. Pat. No. 5,216,044 discloses a synthetic resin emulsion with solid core-shell polymer particles having a diameter of from 0.1 to 5.0 μm which spontaneously become porous in a dry state. A process for producing the synthetic resin emulsion comprises the step of preparing the core particles, e.g., by emulsion polymerization of an acrylate ester an another monomer copolymerizable therewith, and then forming a shell of polymer which is more resistant to hydrolysis than the internal core particle. The fine polymer particles of this synthetic resin emulsion save weight and improve hardness, abrasion resistance and thermal resistance. The particle can also be used for an additive to various compositions, paper, metals, plastics, fibers and cloth.

U.S. Pat. No. 5,254,403 discloses a recording sheet having a substrate and an image receiving layer comprising a mixture of a latex-forming polymer, a polysaccharide and a polymer containing oxyalkylene monomers. The recording sheets are disclosed to exhibit high optical density, minimum intercolor bleeding, and minimum blocking at 50% to 80% humidity and temperatures of over 50° C.

U.S. Pat. No. 4,497,917 discloses a latex composition comprising core-shell polymer particles where the core has a $T_g$ greater than 70° C. and the shell has a $T_g$ of from 25° C. to 60° C. Because of the relatively low $T_g$ shell, the particles can coalesce sufficiently to form continuous layers under the conditions usually employed to form coatings on photographic film bases and layers. Preferred latex compositions comprise core polymers 80% to 95% polymerized $\alpha,\beta$-ethylenically unsaturated monomer, and shell polymers also of polymerized $\alpha,\beta$-ethylenically unsaturated monomers.

U.S. Pat. No. 4,891,285 discloses an image copy film comprising a film substrate, an image-receiving layer on a surface of the substrate and a toner image layer on the surface of the receiving layer remote from the substrate. The receiving layer comprises of a terpolymer comprising a vinyl halide, a vinyl ester of a saturated aliphatic carboxylic acid, the molecule of which contains from 2 to 6 carbons; and a functional group containing ethylenically-unsaturated termonomer. This copy film has improved toner adhesion and superior resistance to abrasion and erasure.

U.S. Pat. No. 5,212,008 discloses a recording sheet comprising a substrate, a first coating and a second coating thereover. The first coating comprises a polymer, a crosslinking agent therefor, and a catalyst. The second coating comprises a binder and a quaternary amino compound.

U.S. Pat. No. 5,254,403 discloses a recording sheet comprising a substrate and an image receiving layer comprising a mixture of a latex-forming polymer, a polysaccharide and a polymer containing oxyalkylene monomers. The recording sheets exhibit high optical density, minimum intercolor bleeding, and minimum blocking at humidities of 50% to 80% at temperatures of over 50° C.

U.S. Pat. No. 5,208,211 discloses an image receiving sheet including a transparent support and an overcoat layer. The overcoat layer includes a thermoplastic resin which has a fluidification initiation temperature lower than that of a toner for image formation to be employed or that of a resin for use in said toner, and is white and opaque from being in a porous state.

U.S. Pat. No. 5,289,245 discloses a recording material for use in electrography in which a toner image is formed on the recording material and then fixed thereto by the applying pressure to the toner image using a fixing rotatable member coated with a releasing agent. In one embodiment, the recording material has a base layer, a first resin layer having greater compatibility with the toner than the base layer, and a second resin layer containing a releasing agent absorber. In another embodiment, the compatible resin layer contains the releasing agent absorber. In an embodiment for color imaging, the resin layer containing the releasing material absorber is provided under the compatible layer.

U.S. Pat. No. 5,266,383 discloses a recording medium comprises a surface layer composed mainly of aluminum oxide particles and a lower layer having ink absorptivity, this lower layer being formed of paper. The aluminum oxide particles have particle sizes of 5 μm or less. This can give an image that is high in density, has excellent ink absorptivity and color forming characteristics, with little deterioration due to in-room decoloration.

U.S. Pat. No. 5,330,823 discloses a recording sheet comprising a substantially transparent substrate, a binder polymer coated thereon, and particles of an antistatic component present on at least the surface of the binder polymer coating. Alternately, a transparent recording sheet is provided wherein both an antistatic component and an anti-slip component are contained in a single coating layer of the sheet.

U.S. Pat. No. 5,308,389 discloses a water-based composition for forming a flexible film on metals and other surfaces, comprising a water-dispersible polyurethane elastomer, an anti-corrosive agent, a thickener, a dispersing agent and an antifreeze agent. This provides a non-yellowing high gloss film which quickly becomes tack-free.

U.S. Pat. No. 5,183,504 discloses an aqueous metallic coating composition comprising 1) an aqueous acrylic resin of from 5% to 40% by weight of amide group containing ethylenic monomers, 3% to 15% by weight of acid group containing ethylenic monomers, 10% to 40% by weight of hydroxyl group containing ethylenic monomers and the balance of other ethylenic monomers and a portion of the acid group is neutralized, and 2) a specific urethane oligomer dispersion containing a primary and/or secondary polyamine.

U.S. Pat. No. No. 5,141,983 discloses an aqueous coating composition comprising 1) an aqueous polyurethane resin obtained by reacting a diisocyanate and glycols containing a carboxylic acid group containing glycol to prepare an urethane prepolymer, neutralizing the urethane prepolymer and subjecting the neutralized urethane prepolymer to chain extension with a hydrazine derivative; and 2) an aqueous dispersion of an acrylic copolymer whose constituent monomers contain carbonyl group containing monomer or an amido group containing monomer in an amount of at least 0.5 parts by weight per 100 parts by weight of total polymerizable monomers. The weight ratio in terms of solid content, of 1) to 2) is 100/5 to 5/100. This composition can be used, among other things, as a wetting agent, a thickener and/or rheology controlling agent, or a film formation aid.

U.S. Pat. No. 5,156,904 discloses an oriented polymeric film in-line coated with polyethyleneimine before heat setting of the film. When used to make a laminate with other polymers such as polyethylene or ionomer type polymers, this film shows no signs of delamination between the polymeric film and the extrusion coated polymer after 2 hours in water at 121° C. at 15 psi. Polyethylene terephthalate is preferred.

U.S. Pat. No. 5,212,273 discloses crosslinked polymeric microparticles obtained by polymerization of a mixture of ethylenically unsaturated monomers being substantially free of monomers containing polar groups. At least one of said monomers is a polyethylenically unsaturated crosslinking monomer free of oxyethylene groups. The crosslinked polymeric microparticles are prepared by aqueous emulsion polymerization techniques in the absence of polyester emulsifier, and are separated from the aqueous polymerization medium and converted into organic medium by azeotropic distillation. The microparticles are useful in organic solvent-based high solids coating compositions and can be used in color coats, clear coats or composite color-clear coatings. The microparticles are disclosed to improve the sag resistance and the metallic pigment pattern control of the coating and do not detract from the overall desirable properties of the coating.

U.S. Pat. No. 5,310,591 discloses a transparent image-recording sheet suitable for use in a plain paper copier comprising a transparent backing having two major surfaces, said sheet having a machine direction, and a transverse direction, at least one of the major surfaces having coated thereon a transparent water-based toner-receptive coating comprising: a) from about 65 to about 99.9 parts of an imageable polymer; b) from about 0.1 to about 15 parts of at least one polymeric particle having a mean particle size ranging from about 1 μm to about 15 μm, and c) from 0 to about 20 parts of an antistatic agent, the toner-receptive coating being coated onto the trans-parent backing at a time during manufacture of the backing selected from the group consisting of a) before any orientation of said film, and b) after uniaxial orientation in the machine direction.

U.S. Pat. No. 5,310,595 discloses a transparent image-recording sheet suitable for use in a plain paper copier, comprising a transparent backing having two major surfaces, said sheet having a machine direction, and a transverse direction, at least one of the major surfaces having coated thereon, a transparent water-based toner-receptive coating comprising an imageable polymer formed from at least one monomer selected from the group consisting of bicyclic alkyl(meth)acrylates, aliphatic alkyl (meth)acrylates having from about one to about 12 carbon atoms, aromatic (meth)acrylates, and a polar monomer having the formula:

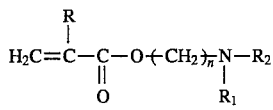

wherein R is hydrogen or methyl, $R_1$ and $R_2$ may be hydrogen, alkyl groups having up to about 12 carbon atoms, preferably up to about 2 carbon atoms, or the quaternary cationic salts thereof, at least one long chain polymeric particle having good antifriction characteristics and optionally, an antistatic agent selected from the group consisting of cationic agents, anionic agents, fluorinated agents, and nonionic agents. The present inventors have now discovered a class of core/shell latex polymers that can be coated from an aqueous medium in the form of a latex onto a substrate, to form a transparent film having an image-receptive coating useful for producing an image on various copiers using a variety of toners with differing binder resins, with excellent toner adhesion, good image quality and good feedability.

SUMMARY OF THE INVENTION

The invention provides a water-based toner-receptive composition suitable for electrophotographic or xerographic imaging, comprising:

a) from about 65 to about 99 parts of a transparent film-forming core/shell latex polymer, wherein the ratio of core to shell of said core/shell latex polymer ranges from about 10/90 to about 90/10, with the core having a lower $T_g$ than the shell;

b) from about 1 to about 15 parts polymeric particles; and c) from 0 to about 20 parts of an antistatic agent selected from the group consisting of cationic agents, anionic agents, fluorinated agents, and nonionic agents.

Preferred toner-receptive compositions of the invention comprise:

a) a core/shell latex polymer comprising:
1) a core formed from:
  i) about 60 to 100 parts of at least one α,β-ethylenically unsaturated monomer having from about 1 to about 12 carbon atoms;
  ii) 0 to about 40 parts of at least one monomer selected from the group consisting of bicyclic alkyl (meth)acrylates and aromatic (meth)acrylates; and
2) a shell formed from:
  i) about 35 to 100 parts of at least one α,β-ethylenically unsaturated monomer having from about 1 to about 12 carbon atoms; and
  ii) 0 to about 65 parts of at least one monomer selected from the group consisting of bicyclic alkyl (meth)acrylates and aromatic (meth)acrylates;

b) from about 1 to about 15 parts polymeric particles having an average particle size of from about 0.25 μm to about 15 μm, comprising:

1) at least about 20 parts by weight polymerized diol di(meth)acrylate having a formula

wherein $R^2$ is hydrogen or a methyl group, and n is an integer from about 4 to about 18, 2) from 0 to about 80 parts of at least one copolymerized vinyl monomer having the formula

wherein $R^2$ is hydrogen or a methyl group and m is an integer of from about 12 to about 40, and 3) from 0 to about 30 parts of at least one copolymerized ethylenically unsaturated monomer selected from the group consisting of vinyl esters, acrylic esters, methacrylic esters, styrene, derivatives thereof, and mixtures thereof, a, b and c having a total of 100 parts, and having an average particle size of from about 0.25 μm to about 15 μm;

C) from 0 to about 20 parts of an antistatic agent selected from the group consisting of cationic agents, anionic agents, fluorinated agents, and nonionic agents.

The invention also provides transparent image-receptive sheets suitable for imaging in a variety of printers and electrophotographic and xerographic copiers. The image-receptive sheets comprise a transparent polymeric substrate having coated on at least one major surface thereof, a water-based toner-receptive composition comprising the core/shell latex polymers disclosed herein.

These terms as used herein have the following meanings.

1. The term "core/shell latex polymer" means a polymer particle wherein each discrete particle has a core surrounded by a shell.

2. The terms (meth)acrylic, (meth)acrylate and the like mean that both the methacrylic and acrylic versions of the equivalent are included in the group defined.

All parts, percents, and ratios herein are by weight unless specifically stated otherwise.

DETAILED DESCRIPTION OF THE INVENTION

Water-based toner-receptive compositions of the invention comprise a core/shell latex polymer, wherein the ratio of core to shell of said core/shell latex polymer ranges from about 10/90 to about 90/10, preferably from about 25/75 to about 50/50. The core polymer has a lower $T_g$ than the shell. The $T_g$ of the core preferably ranges from about −60° C. to about 20° C., more preferably from about −10° C. to about 5° C. The $T_g$ of the shell preferably ranges from about 35° to about 100° C., more preferably, from about 40° to about 90° C. When $T_g$ of the shell gets below 35° C., the composition becomes too soft, and has blocking problems, particularly in high temperature and/or high humidity. A typical symptom of blocking problems is difficulty in separating adjacent transparent sheets of a stack. On the other hand, when $T_g$ gets above 100° C., the toner adhesion is lower than desired.

The presence of the core appears to allow the use of a shell having a higher $T_g$ than normally possible without significant loss of toner adhesion. This is true even though only the shell material actually comes into contact with the toner. It is believed that the lower temperature core material allows the overall latex emulsion in the dried film state to perform as a high impact resistant composite and capable of absorbing applied stresses. This effect can be readily measured using an Instron. The core/shell latex material has a percent elongation at break of 120, while a material made up of only the shell portion has a percent elongation at break of 13.

In the present invention, the more compliant core/shell image-receptive layer allows the toner particles to come into contact with more surface area of the layer, while the lower $T_g$ of the core material aids a faster softening of the image-receptive layer with high $T_g$ shell at the high temperature of the fuser rollers, thus giving good toner adhesion.

The core is made from at least one α,β-ethylenically unsaturated monomer having from about 1 to about 12 carbon atoms. This monomer makes up from about 60 to 100 parts, preferably from about 75 to about 90 parts of the core. Where this monomer comprises less than 100%, the core also contains at least one monomer selected from the group consisting of bicyclic alkyl (meth)acrylates, and aromatic (meth)acrylates. This monomer can comprise up to about 40 parts, preferably from about 10 to about 25 parts.

The shell is likewise formed from at least one α,β-ethylenically unsaturated monomer containing from about 1 to about 12 carbon atoms. This monomer may comprise up to 100 parts of the shell, preferably from about 45 to about 80 parts. Where this monomer comprises less than 100 parts, the shell can also comprise up to about 65 parts, preferably from about 20 to about 55 parts, of at least one monomer selected from the group consisting of bicyclic alkyl (meth)acrylates, and aromatic (meth)acrylates.

Useful α,β-ethylenically unsaturated monomers include, but are not limited to, methyl acrylate, ethyl acrylate, methyl (meth)acrylate, isobutyl (meth)acrylate, isodecyl (meth)acrylate, cyclohexyl (meth)acrylate, n-butyl acrylate, styrene, vinyl esters, and the like. Preferred monomers include methyl (meth)acrylate, ethyl (meth)acrylate and isodecyl (meth)acrylate.

Useful bicyclic (meth)acrylates include, but are not limited to, dicyclopentenyl (meth)acrylate, norbornyl (meth)acrylate, and isobornyl (meth)acrylate. Preferred bicyclic monomers include dicyclopentenyl (meth)acrylate. Useful aromatic (meth)acrylates include, but not limited to, benzyl(meth)acrylate.

The core polymer, and/or the shell polymer, can also contain from 0 to 20 parts of a polar monomer selected from the group consisting of acrylic (meth)acrylic acid or hydroxyalkyl(meth)acrylates; and nitrogen-containing compounds including N-alkylacrylamide, N,N-dialkyl amino monoalkyl (meth)acrylate, N-alkyl amino alkyl (meth)acrylate, and their cationic salts thereof, all said above alkyl groups having up to 8 carbon atoms, preferably up to 2 carbon atoms.

Preferred polar monomers include hydroxyethylacrylate and methacrylate, N-methylacrylamide, n-butylmethacrylamide, N-methylolacrylamide, N-butylaminoethyl(meth)acrylate, N,N'-diethylaminoethyl(meth)acrylate, N,N'-dimethyl aminoethyl(meth)acrylate, N,N'-dimethyl amino ethyl (meth)acrylate, and isobutoxy(meth)acrylamide.

When these polar monomers are present in the shell polymer, the shell polymer is preferably crosslinked. Some of the polar monomers, e.g., n-methylolacrylamide and isobutoxy methacrylamide can undergo self-crosslinking during the drying stage, while others required an additional crosslinker to be present. Useful crosslinkers include polyfunctional aziridines such as trimethylolpropane-tris-(β-(N-Aziridinyl)propionate), Pentaerythritol-tris-(β-(N-aziridinyl)propionate), trimethylolpropane-tris-(β-(N-methylaziridinyl)propionate), and the like; ureaformaldehyde, melamine formaldehyde, isocyanate, multifunctional epoxy polymers, alkyldialkoxy silane, γ-aminopropyl trimethoxysilane, vinyl triethoxy silane, vinyl tris(β-methoxy ethoxy)-silane, vinyl triacetoxy silane, γ-methacryloxypropyltrimethyoxy silane, γ-(β-amino ethyl)aminopropyl trimethoxysilane, and the like.

The core/shell latex polymers are polymerized using emulsion polymerization techniques. Such techniques are well known in the art. Emulsion polymerization techniques require the presence of emulsifiers in the polymerization vessel. Useful emulsifiers include those selected from the group consisting of anionic surfactants, nonionic surfactants and mixtures thereof. Specific examples can include those whose molecular structure includes at least one hydrophobic moiety selected from the group consisting of from about $C_6$—to about $C_{12}$—alkyl, alkylaryl, and/or alkenyl groups as well as at least one anionic group selected from the group consisting of sulfate, sulfonate, phosphate, polyoxyethylene sulfate, polyoxyethylene sulfonate, polyoxyethylene phosphate, and the like, and the salts of such anionic groups, wherein said salts are selected from the group consisting of alkali metal salts, ammonium salts, tertiary amino salts, and the like.

Representative commercial examples of useful anionic surfactants include sodium lauryl sulfate, available from Stepan Chemical Co. as POLYSTEP™ B-3; sodium lauryl ether sulfate, available from Stepan Chemical as POLYSTEP™ B-12; and sodium dodecyl benzene sulfonate, available from Rhone-Poulenc as SIPONATE™ DS-10.

Useful nonionic surfactants include those whose molecular structure comprises a condensation product of an organic aliphatic or alkyl aromatic hydrophobic moiety with a hydrophilic alkylene oxide such as ethylene oxide. The HLB (Hydrophilic-Lipophilic Balance) of useful nonionic surfactants is about 10 or greater, preferably from about 10 to about 20. The HLB of a surfactant is an expression of the balance of the size and strength of the hydrophilic (water-loving or polar) groups and the lipophilic (oil-loving or non-polar) groups of the surfactant. Commercial examples of nonionic surfactants useful in the present invention include nonylphenoxy or octylphenoxy poly(ethyleneoxy) ethanols available from Rhone-Poulenc as the IGEPAL™ CA or CO series, respectively; $C_{11}$–$C_{15}$ secondary-alcohol ethoxylates available from Union Carbide as the TERGITOL™ 15-S series; and polyoxyethylene sorbitan fatty acid ester available from ICI Chemicals as the TWEEN™ series of surfactants.

Most preferably, the emulsion polymerization of this invention is carried out in the presence of a mixture of anionic surfactant(s) and nonionic surfactant(s), wherein the ratio of anionic surfactant:nonionic surfactant is from about 10:90 to about 90:10. A useful range of emulsifier is from about 1 to about 8 weight percent, preferably from about 1.5 to about 7 percent, and most preferably from about 2 to about 5 weight percent, based on the total weight of all monomers in both the core and the shell of the latex polymer.

Water soluble thermal initiators are also present in the emulsion polymerization of core/shell latex polymers. Suitable ones include those selected from the group consisting of potassium persulfate, ammonium persulfate, sodium persulfate, and mixtures thereof; and oxidation-reduction initiators such as the reaction product of the above-mentioned persulfates and reducing agents such as those selected from the group consisting of sodium metabisulfite and sodium bisulfite. The preferred watersoluble thermal initiators are potassium persulfate and ammonium persulfate. Preferably, most water-soluble initiators are used at temperatures of from about 50° to about 70° C., while the oxidation-reduction-type initiators are preferably used at temperature of from about 25° to about 50° C. Water-soluble thermal initiators comprise from about 0.05 to about 2 parts, preferably about 0.1 to about 0.5 parts based on the total weight of monomers in the emulsion.

Apart from the spherical core/shell latex polymers, other polymeric particles are useful in the present invention. These can range from about 1 μm to about 15 μm in diameter and can include poly(methylmethacrylate)(PMMA), modified poly(methylmethacrylate), poly(tetrafluorethylene), polyethylene, particles produced from diol di(meth)acrylate homopolymers which impart antifriction characteristics when coated on image recording sheets. These diol di(meth)acrylates can be reacted with long-chain fatty alcohol esters of (meth)acrylic acid. Preferred embodiments contain particles selected from PMMA, modified PMMA, and particles produced from either diol-di(meth)acrylate homopolymers or copolymers of diol di(meth)acrylates and long-chain fatty alcohol esters of (meth)acrylic acid.

Other useful particles include inorganic particles such as silica, polymeric particles such as PMMA, modified PMMA, polyethylene and tetrafluoropolyethlene, porous organic particles such as ureaformaldehyde, and coated silicas. For good feedability under all conditions, a bimodal particle distribution is preferred. The mean particle size preferably ranges from 0.25 μm to 15 μm. Particles smaller than 0.25 μm would require the use of more particles to produce an effective coefficient of friction, and this would tend to also produce more haze. Larger particles than 15 μm would require thicker coatings to anchor the particles firmly in the coatings, which would increase haze and coating cost.

For optimal performance, the particles preferably have narrow particle size distributions, i.e., a standard deviation of up to 20% of the average particle size. These ranges are preferably 0.1–0.7 μm, 1–6 μm, 3–6 μm, 4–8 μm, 6–10 μm, 8–12 μm, 10–15 μm. More preferred particles are those having bimodal particle size distributions. This is made by mixing particles having 2 different particle size distributions such as particles having a distribution of sizes from 1–4 μm mixed with 6–10 μm.

When bimodal particles are used, both particles can be selected from the long chain alkyl polymeric beads described above, or one of the particles can be selected from such beads and one selected from other beads such as PMMA and polyethylene beads, or inorganic particles such as silica particles, the second type of bead or particle also preferably having a narrow particle size distribution.

Whatever particle combination is used, suitable noncore/shell particle size combinations include particle size distributions of from 1 to 4 μm and from 6 to 10 μm, or from 2 to 6 μm and from 8 to 12 μm, or from 0.20 to 0.5 μm and from 1–6 μm.

An antistatic agent may also be present in the coating. Useful agents are selected from the group consisting of nonionic antistatic agents, cationic agents, anionic agents, and fluorinated agents. Useful agents include such as those glycol ethers available under the trade name ATMER™, e.g., ATMER™ 110, 1002, 1003, 1006, and the like, derivatives of Jeffamine™ ED-4000, 900, 2000 with FX8 and FX10, a polyoxyalkylenediamene available from 3M, a proprietary quaternary ammonium compound tradenamed Larostat™ 60A, and tris-alkyl,polyalkoxyalkyene ammonium tradenamed Markastat™ AL-14, available from Mazer Chemical Co., with the preferred antistatic agents being steramido-propyldimethyl-β-hydroxy-ethyl ammonium nitrate, available as Cyastat™ SN, N,N'-bis(2-hydroxyethyl)-N-(3'-dodecyloxy-2,2-hydroxylpropyl) methylammonium methylsulfate, available as Cyastat™ 609, both from American Cyanamid. When the antistatic agent is present, amounts of up to 20% (solids/solids) may be used. Preferred amounts vary, depending on coating weight. When higher coating weights are used, 1–10% is preferred, when lower coating weights are used, 5–15% is preferred. If desired, additional emulsifiers can also be present in the coating solution. The emulsifiers include nonionic, or anionic emulsifiers, and mixtures thereof, with nonionic emulsifiers being preferred. Suitable emulsifiers include those having a HLB of at least 10, preferably from 12 to 18. Useful nonionic emulsifiers include $C_{11}$ to $C_{18}$ polyethylene oxide ethanol, such as Tergitol™, especially those ethoxylated thimethyl nonanols designated series "S" from Union Carbide Corp, those ethoxylated alcohols available as Triton™ from Rohm and Haas Co., and sorbitan monooleates named the Tween™ series available from ICI America. Useful anionic emulsifiers include sodium salts of alkyl sulfates, alkyl sulfonates, alkylether sulfates, oleate sulfates, alkylarylether sulfates, alkylaryl polyether sulfates, and the like. Commercially available examples include such as those alcohol phenoxy salts available under the trade names Siponate™ and Siponic™ from Alcolac, Inc. When used, the emulsifier is present at levels of from 1% to 7%, based on polymer, preferably from 2% to 5%.

Additional wetting agents with HLB values of 7–10 may be present in the emulsion to improve coatability. These additional surfactants are added after polymerization is complete, prior to coating of the polymeric substrate. Preferred additional wetting agents include fluorochemical surfactants such as

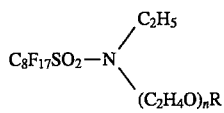

wherein n is from 6 to 15 and R can be hydrogen or methyl. Useful examples include FC-170C. and FC-171, available from 3M. Another useful wetting agent is Triton™ X-100, octylphenoxy polyethyoxy ethanol, available from Union Carbide.

Addition of a coalescing agent is also preferred for emulsion based layers to ensure that the coated material coalesces to form a continuous and integral layer and will not flake in conventional printing process. Compatible coalescing agents include propylcarbitol, available from Union Carbide as the Carbitol™ series, as well as the ethylene glycol monoethyl ether, tradenamed the Cellusolve™ series, ethylene glycol propyl ether, tradenamed the Propasolve™ series, proprietary glycol ether/ethyl esters tradenamed Ektasolve™ [and Ektasolve] series of coalescing agents, also from Union Carbide. Other useful agents include the acetate series from Eastman Chemicals Inc., the Dowanol™ E alkylene glycol alkyl ether series, Dowanol™ E acetate series, and proprietary glycol ether Dowanol™ PM series and their acetate series from Dow Chemical, N-methyl-2-pyrrolidone from GAF, and 3-hydroxy-2,2,4-trimethyl pentyl isobutryate, available as Texanol™, from Eastman Chemicals Inc. These coalescing agents can be used singly or as a mixture.

One preferred optional ingredient in the emulsion polymerized embodiment of the invention is an additional adhesion promotor to enhance durability of thicker coatings to the substrate. Useful adhesion promoters include organo-functional silanes having the following general formula:

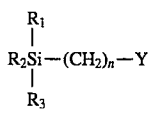

wherein $R_1$, $R_2$, and $R_3$ are selected from the group consisting of an alkoxy group and an alkyl group with the proviso that at least one alkoxy group is present, n is an integer from 0 to 4, and Y is an organofunctional group selected from the group consisting of chloro, methacryloxy, amino, glycidoxy, and mercapto. Useful silane coupling agents include such as γ-aminopropyl trimethoxysilane, vinyl triethoxy silane, vinyl tris(β-methoxy ethoxy)-silane, vinyl triacetoxy silane, γ-methacryloxypropyltrimethyoxy silane, γ-(β-amino ethyl)aminopropyl trimethoxysilane, and the like. The adhesion promotor may be present at levels of from 0.5% to 15% of the total resin, preferably from 4% to 10%.

Film substrates for use with toner-receptive compositions of the invention may be formed from any polymer capable of forming a self-supporting sheet, e.g., films of cellulose esters such as cellulose triacetate or diacetate, polystyrene, polyamides, vinyl chloride polymers and copolymers, polyolefin and polyallomer polymers and copolymers, polysulphones, polycarbonates, polyesters, and blends thereof. Suitable films may be produced from polyesters obtained by condensing one or more dicarboxylic acids or their lower alkyl diesters in which the alkyl group contains up to 6 carbon atoms, e.g., terephthalic acid, isophthalic, phthalic, 2,5- ,2,6- and 2,7-naphthalene dicarboxylic acid, succinic acid, sebacic acid, adipic acid, azelaic acid, with one or more glycols such as ethylene glycol, 1,3-propanediol, 1,4-butanediol, and the like.

Preferred film substrates or backings are cellulose triacetate or cellulose diacetate, polyesters, especially polyethylene terephthalate, and polystyrene films. Polyethylene terephthalate is most preferred. It is preferred that film backings have a caliper ranging from 50 μm to 150 μm. Film backings having a caliper of less than 50 μm are difficult to handle using conventional methods for graphic materials. Film backings having calipers over 150 μm are very stiff, and present feeding difficulties in certain commercially available copying machines.

To promote adhesion of the toner-receptive composition to the film substrate, it may be desirable to treat the surface of the film substrate with one or more primers, in single or multiple layers. Useful primers include those known to have a swelling effect on the substrate polymer. Examples include halogenated phenols dissolved in organic solvents. Alternatively, the surface of the film substrate may be modified by treatment such as corona treatment or plasma treatment.

The primer layer, when used, should be relatively thin, preferably less than 2 μm, most preferably less than 1 μm, and may be coated by conventional coating methods.

Transparencies of the invention comprise a substrate and water-based toner-receptive composition coated on at least one major surface thereof. Transparencies of the invention are particularly useful in the production of imaged transparencies for viewing in a transmission mode or a reflective mode, i.e., in association with an overhead projector. Other optional ingredients may be present in the film-forming polymer for the purposes of improving coatability, or other features.

The following examples are provided for illustrative purposes only, and do not limit the scope of the invention, which is reflected only by the claims.

EXAMPLE 1

A transparency film having a toner receptive layer is prepared and tested as follows:

A. PREPARATION OF THE CORE/SHELL LATEX POLYMER 2544 gms of deionized water, 58 gms of Triton™ X405, available from Union Carbide, and 5.1 gms of Siponate™ DS 10, available from Rhone-Polenc, were added to a four-neck flask equipped with a reflux condenser, thermometer, stirrer, metering pump and nitrogen gas inlet. The mixture was then stirred and heated to 60° C. under nitrogen atmosphere. During heating, the core monomer pre-mix containing 40 gms of isobornylacrylate (IBOA) and 363 gms of ethylacrylate (EA) was charged into the reactor. When the batch temperature levelled off at 60° C., the initiator was added to the reactor to initiate the polymerization, and the reaction was allowed to exotherm. At the exotherm peak, the batch temperature set point was raised to 70° C. for the rest of the polymerization period, and the shell monomer premix containing 330 gms of IBOA, 518 gms methylmethacrylate (MMA), and 94 gms of EA was fed into the reaction using a metering pump. The shell monomer feed took about 60 to 70 minutes to complete. When the shell monomer feed was completed, the polymerization was continued for two hours at 70° C. to eliminate residual monomers. The latex was then cooled to room temperature and filtered through 25 μm filter to remove coagulum. The latex having a ratio of core:shell of 30:70 was then ready for use.

B. MIXING OF LATEX COATING SOLUTION 16.54 gms of Triton™ X-405 was slowly added to 661.67 gms of latex with stirring. 3.57 gms of 50% solids solution of Cyastat™ SN was then added along with 3.57 gms of 50% solids solution Cyastat™ 609. 85.0 gms of 10% solids FC-170C premix was then introduced into the latex with stirring, along with 16 gms of SMA beads having a particle size of 4 μm, 16 gms of SMA beads having a particle size of 8 μm, and 39.7 gms of A1120 adhesion promotor, available from Union Carbide.

To this solution was added D.I. water, to make up a total of 3400 gms. Finally, 2.6 gms of 10% solids solution of Dow 65 defoamer was added with mixing. The final coating solution of latex had a concentration of 5.7% solids.

C. COATING OF THE LATEX COATING SOLUTION

The coating solution was applied on an air corona treated 100 μm poly(ethylene terephthalate) (PET) film, using a gravure roll coating device, and dried. The drying of the coated web was done in two steps inside the oven with zone 1 set at 93° C. and zone 2 set at 149° C. The web remained in each zone for 12 seconds. The dried coating weight was 0.26 gms/m².

D. MEASUREMENT OF PROPERTIES

All the properties, both functional and nonfunctional, were measured using various commercially available copiers. The results are summarized in the following table.

Image-receptive sheets of the invention were fed into five different copiers at various temperatures and relative humidities. The following table shows the number of misfeeds for each machine, and the total sheets fed.

EXAMPLE 2

A transparency film having a toner receptive layer is prepared and tested as follows:

A. PREPARATION OF THE CORE/SHELL LATEX POLYMER 2544 gms of deionized water, 58 gms of Triton™ X405, and 5.1 gms of Siponate™ DS10 were added to a four-neck flask equipped with a reflux condenser, thermometer, stirrer, metering pump and nitrogen gas inlet. The mixture was then stirred and heated to 60° C. under nitrogen atmosphere. During heating, the core monomer pre-mix containing 40 gms of isobornylacrylate (IBOA) and 363 gms of ethylacrylate (EA) was charged into the reactor. When the batch temperature reached 60° C., the initiator was added to the reactor to initiate the polymerization, and the reaction allowed to exotherm. At the exotherm peak, the batch temperature set point was raised to 70° C. for the rest of the polymerization period, and the shell monomer premix containing 330 gms of IBOA, 518 gms methylmethacrylate (MMA), and 94 gms of EA was fed into the reaction using a metering pump. The shell monomer feed took about 60 to 70 minutes to complete. When the shell monomer feed was completed, the polymerization was continued for two hours at 70° C. to eliminate residual monomers. The latex was then cooled to room temperature and filtered through 25 µm filter to remove coagulum. The latex having a ratio of core:shell of 30:70 was then ready for use.

B. MIXING OF LATEX COATING SOLUTION 38.7 gms of N-methylpyrrolidone (NMP) was slowly added to 364.7 gms of core/shell latex from part A with stirring. 64.5 gms of a 10% solids solution of Cyastat™ 609 and 30 gms of 10% solids FC 170C. premix were then introduced into the latex with stirring, along with 20 gms of a 30% slurry of SMA beads having a mean particle size of 4 µm. To this was added 30 gms of a 20% solution of Syloid™ 221, available from Grace Davidson, having a mean particle size of 10–12 µm, and 49.6 gms of a 10% solution of Al120 adhesion promotor available from Union Carbide, and 96 gms of a 10% solution to Triton® X-405. To this solution was added 87.6 gms of D.I. water.

C. COATING OF THE LATEX COATING SOLUTION

Using a gravure roll coating device, the coating solution was applied on an air corona treated 100 µm poly(ethylene terephthalate)(PET) film, and dried. The drying of the coated web was done in two steps inside the oven with zone 1 set at 93° C. and zone 2 set at 149° C. The web remained in each zone for 12 seconds. The dried coating weight was 0.26 gms/m².

D. MEASUREMENT OF PROPERTIES

All the properties, both functional and nonfunctional, were measured using various commercially available copiers. The results are summarized in Tables 1A and 1B; both Examples had a coating durability value of 4 and a toner adhesion of over 1100.

TABLE 1A

| EX | COF | SURFACE RESISTIVITY (Ω/sq, 50% RH, 25° C.) S1 | % HAZE PRECOPY | POSTCOPY |
|---|---|---|---|---|
| 1 | .23 | 1.7 × 10¹¹ | 1.1 | 1.4 |
| 2 | .37 | 2.2 × 10¹² | 2 | 2 |

TABLE 1B

| COPIER | CONDITIONS | MISFEEDS EX 1 | EX 2 |
|---|---|---|---|
| Xerox 5028 | 21° F./50/R.H. | 0/300 | 1/300 |
| Xerox 5028 | 21° F./20/R.H. | 0/200 | 1/300 |
| Xerox 5028 | 27° F./80/R.H. | 0/100 | 0/100 |
| Xerox 5065 | 21° F./50/R.H. | 0/300 | 0/400 |
| Ricoh 7060 | 21° F./50/R.H. | 0/300 | 15/500 |
| Sharp SF8870 | 21° F./50/R.H. | 0/300 | N/A |
| Mita DC 4585 | 21° F./50/R.H. | 0/300 | N/A |
| Canon NP 6670 | N/A | N/A | 1/200 |

A transparency film having a toner receptive layer is prepared and tested as follows:

A. PREPARATION OF THE CORE/SHELL LATEX POLYMER 2544 gms of deionized water, 58 gms of Triton™ X405 and 5.1 gms of Siponate™ DS 10 were added to a four-neck flask equipped with a reflux condenser, thermometer, stirrer, metering pump and nitrogen gas inlet. The mixture is then stirred and heated to 60° C. under nitrogen atmosphere. During heating, the core monomer pre-mix containing 40 gms of isobornylacrylate (IBOA) and 363 gms of ethylacrylate (EA) were charged into the reactor. When the batch temperature levelled off at 60° C., the initiator is added to the reactor to initiate the polymerization. The reaction is allowed to exotherm. At the exotherm peak, the batch temperature set point was raised to 70° C. for the rest of the polymerization period, and the shell monomer premix containing 330 gms of IBOA, 518 gms methylmethacrylate (MMA), and 94 gms of EA was fed into the reaction using a metering pump. The shell monomer feed took about 60 to 70 minutes to complete. When the shell monomer feed was completed, the polymerization was continued for two hours at 70° C. to eliminate residual monomers. The latex was then cooled to room temperature and filtered through a 25 µm filter to remove coagulum. A latex having a ratio of core:shell of 30:70 was then ready for use.

B. MIXING OF LATEX COATING SOLUTION 38.7 gms of N-methylpyrrolidone (NMP) was slowly added to 364.7 gms of core/shell latex from part A with stirring. 64.5 gms of a 10% solids solution of Cyastat™ 609, and 30 gms of 10% solids FC-170C. premix were then introduced into the latex with stirring, along with 20 gms of a 30% solution of SMA beads having a mean particle size of 4 μm, 30 gms of a 20% solution of Syloid™ 221, having a mean particle size of 10–12 μm, 49.6 gms of a 10% solution of A1120 adhesion promotor available from Union Carbide, and 96 gms of a 10% solution of Triton 405. To this solution was added 2287.6 gms of D.I. water.

C. COATING OF THE LATEX COATING SOLUTION

Using a gravure roll coating device, the coating solution was applied on an air corona treated 100 μm PET film, and dried. The drying of the coated web was done in two steps inside the oven with zone 1 set at 93° C. and zone 2 set at 149° C. The web remained in each zone for 12 seconds. The dried coating weight was 0.26 gms/m².

D. MEASUREMENT OF PROPERTIES

All the properties, both functional and nonfunctional, were measured using various commercially available copiers. The results are summarized in Table 2.

EXAMPLE 3

A transparency film having a toner receptive layer is prepared and tested as follows:

A. PREPARATION OF THE CORE/SHELL LATEX POLYMER 2544 gms of deionized water, 58 gms of Triton™ X405 and 5.1 gms of Siponate™ DS 10 were added to a four-neck flask equipped with a reflux condenser, thermometer, stirrer, metering pump and nitrogen gas inlet. The mixture is then stirred and heated to 60° C. under nitrogen atmosphere. During heating, the core monomer pre-mix containing 40 gms of isobornylacrylate (IBOA) and 363 gm of ethylacrylate (EA) were charged into the reactor. When the batch temperature levelled off at 60° C., the initiator is added to the reactor to initiate the polymerization. The reaction is allowed to exotherm. At the exotherm peak, the batch temperature set point was raised to 70° C. for the rest of the polymerization period, and the shell monomer premix containing 330 gms of IBOA, 471 gms methylmethacrylate (MMA), 47 gms of hydroxyethylmethacrylate (HEMA) and 94 gms of EA was fed into the reaction using a metering pump. The shell monomer feed took about 60 to 70 minutes to complete. When the shell monomer feed was completed, the polymerization was continued for two hours at 70° C. to eliminate residual monomers. The latex was then cooled to room temperature and filtered through a 25 μm filter to remove coagulum. The latex having a ratio of core:shell of 30:70 was then ready.

B. MIXING OF LATEX COATING SOLUTION 38.7 gms of N-methylpyrrolidone (NMP) was slowly added to 364.7 gms of core/shell latex from part A with stirring. 4.5 gms of a 10% solids solution of Cyastat™ 609 and 30 gms of 10% solids FC 170C. premix were then introduced into the latex with stirring, along with 20 gms of a 30% solution of SMA beads having a mean particle size of 8 μm, 30 gms of a 20% solution of Syloid™ 620 having a mean particle size of 10–12 μm, 49.6 gms of a 10% solution of A1120 adhesion promotor, 96 gms of a 10% solution of Brij™ 35. This gave the lubricant content of 7.4 parts per 100 parts of core/shell latex polymer.

To this solution was added 2287.6 gms of D.I. water. Finally, 6.5 gms of 10% solids solution of ammonium was added with mixing, to keep the PH at 9, followed by 12.4 gms of a 10% solution of XAMA-7, available from Sancor, prior to coating.

C. COATING OF THE LATEX COATING SOLUTION

Using a gravure roll coating device, the coating solution was applied on polyvinylidine treated 100 μm poly(ethylene terephthalate) (PET) film, and dried. The drying of the coated web was done in two steps inside the oven with zone 1 set at 93° C. and zone 2 set at 149° C. The web remained in each zone for 12 seconds. The dried coating weight was 0.26 g/m².

D. MEASUREMENT OF PROPERTIES

All the properties, both functional and nonfunctional, were measured using various commercially available copiers. The results are summarized in Table 2.

EXAMPLE 4–10

These image-receptive sheets were made in the same manner as Example 1. Variations in core/shell ratio, $T_g$, and monomer ratio in the core are shown in Table 2 along with test results.

TABLE 2

| Ex. | EA/IBOA in core | core/shell ratio | $T_g$ (°C.) core/shell | % Haze | Crease (mm) |
| --- | --- | --- | --- | --- | --- |
| 2 | 75/25 | 30/70 | −10/80 | 3.5 | 2.0 |
| 3 | 90/10 | 30/70 | −7/77 | 2.7 | 1.1 |
| 4 | 90/10 | 30/70 | −6/79 | 4.4 | 2.8 |
| 5 | 75/25 | 30/70 | 7/80 | 3.5 | 1.9 |
| 6 | 45/55 | 30/70 | 39/76 | 3.6 | 1.2 |
| 7 | 90/10 | 40/60 | −6/76 | 4.5 | .8 |
| 8 | 90/10 | 20/80 | −5/81 | 4.2 | 2.6 |
| 9 | 90/10 | 10/90 | −4/80 | 4.3 | 3.5 |
| 10 | 75/25 | 30/70 | −10/80 | 4.0 | 1.7 |

EXAMPLES 11–12

These image-receptive sheets were made in the same manner as Example 2, except with the following compositions:

| EX | Core/shell (g) | A1120 (g) | XAMA-7 (g) | FC170 (g) | Cyastat 609 (g) | SMA 8 μm (g) | Cymel 303 (g) | Brij 35 (g) | NMP (g) | NH3 (g) |
| --- | --- | --- | --- | --- | --- | --- | --- | --- | --- | --- |
| 11 | 364.7 | 49.6 | 12.7 | 30 | 64.5 | 40 | — | — | 38.7 | 6.5 |

| EX | Core/shell (g) | A1120 (g) | XAMA-7 (g) | FC170 (g) | Cyastat 609 (g) | SMA 8 µm (g) | Cymel 303 (g) | Brij 35 (g) | NMP (g) | NH3 (g) |
|----|---|---|---|---|---|---|---|---|---|---|
| 12 | 364.7 | 49.6 | 12.4 | 30 | 64.5 | 40 | 24.8 | 96 | 38.7 | 6.5 |

These image-receptive sheets were also coated and tested in the same manner, and the results are shown in Table 3.

TABLE 3

| Ex. | COF | % Haze | Toner Adhesion (g) | Crease | Misfeeds (Xerox 1090)/100 |
|---|---|---|---|---|---|
| 11 | .32 | 2.5 | 1237 | .7 | 0 |
| 12 | .23 | 3.9 | 1735 | .3 | 0 |

EXAMPLES 13–14

These image-receptive sheets were made in the same manner as Example 2, except that the core/shell latex polymers were made with N-methylolacrylamide (NMA) instead of HEMA, as shown in Table 4.

TABLE 4

| EX | core/shell latex composition IBOA/MMA/EA/NMA | core/shell Ratio | $T_g$ (°C.) |
|---|---|---|---|
| 13 | core 10/0/90/0 | 40 | −5 |
|    | shell 35/40/20/5 | 60 | 77 |
| 14 | core 10/0/90/0 | 30 | −6 |
|    | shell 35/50/10/5 | 70 | 79 |

These image-receptive sheets were also tested in the same manner as Example 2 and the results are shown in Table 5.

EXAMPLES 15–20

These image-receptive sheets were made in the same manner as Example 2, except with the ingredients shown in Table 5.

TABLE 5

| EX | core/shell latex composition IBOA/MMA/EA/DMAEMA/CBr4 | core/shell ratio | $T_g$ (°C.) |
|---|---|---|---|
| 15 | core 10/10/75/5/.2 | 40 | 1 |
|    | shell 35/40/20/5/.2 | 60 | 49 |
| 16 | core 10/10/75/5/.2 | 40 | 6 |
|    | shell 35/40/20/5/.2 | 60 | 54 |
| 17 | core 10/7.5/77.5/5/.2 | 40 | 3 |
|    | shell 35/37.5/22.5/5/.2 | 60 | 50 |
| 18 | core 10/5/80/5/.2 | 40 | −2 |
|    | shell 35/35/25/5/.2 | 60 | 43 |
| 19 | core 0/15/80/5/.2 | 40 | 4 |
|    | shell 0/75/20/5/.2 | 60 | 55 |
| 20 | core 0/15/80/5/.2 | 40 | 3 |
|    | shell 0/70/25/5/.2 | 60 | 51 |

These image-receptive sheets were also tested in the same manner as Example 2 and the results are listed in Table 7.

EXAMPLES 21–22

These image-receptive sheets were made in the same manner as Example 2, except with the compositions shown in Table 6.

TABLE 6

| EX | core/shell latex composition IBOA/MMA/EA/AA/CBr4 | core/shell ratio |
|---|---|---|
| 21 | core 0/10/90/0/.2 | 40 |
|    | shell 35/25/35/5/.2 | 60 |
| 22 | core 0/10/90/0/.2 | 40 |
|    | shell 35/25/35/5/.2 | 60 |

The coating solution for Example 21 was made in the manner of Example 1, except that XAMA-7 and Zelec were both added as crosslinkers, while the coating solution of Example was made with Zelec crosslinker alone. These image-receptive sheets were tested in the same manner as Example and the results are shown in Table 7.

TABLE 7

| EX | COF | % Haze | Toner Adhesion (g) | Crease (mm) |
|---|---|---|---|---|
| 13 | .33 | 1.9 | 1727 | .4 |
| 14 | .3 | 2.9 | 1727 | .3 |
| 15 | N/A | N/A | 1160 | N/A |
| 16 | N/A | N/A | 1160 | N/A |
| 17 | N/A | N/A | 1160 | N/A |
| 18 | N/A | N/A | 1160 | N/A |
| 19 | N/A | N/A | 426 | N/A |
| 20 | N/A | N/A | 711 | N/A |
| 21 | .39 | .9 | 1760 | .1 |
| 22 | .35 | 1.1 | 1442 | .3 |

What is claimed is:

1. A water-based toner-receptive composition suitable for electrophotographic or xerographic imaging, comprising:

a) from about 65 to about 99 parts of a transparent film-forming core/shell latex polymer, wherein the ratio of core to shell of said core/shell latex polymer ranges from about 10/90 to about 90/10, with the core having a lower $T_g$ than the shell, wherein said polymer comprises 1) a core formed from:
   i) from about 60 to 100 parts of at least one α,β-ethylenically unsaturated monomer having from about 1 to about 12 carbon atoms; and
   ii) 0 to about 40 parts of at least one monomer selected from the group consisting of bicyclic alkyl(meth)acrylates and aromatic (meth)acrylates; and 2) a shell formed from:
   i) 0 to about 65 parts of at least one monomer selected from the group consisting of bicyclic alkyl (meth)acrylates and aromatic (meth)acrylates; and
   ii) about 35 to 100 parts of at least one α,β-ethylenically unsaturated monomer having from about 1 to about 8 carbon atoms;

b) from about 1 to about 15 parts polymeric particles having an average particle size of from about 0.25 µm to about 15 µm, comprising:
   1) at least about 20 parts by weight polymerized diol di(meth)acrylate having a formula

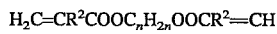

wherein $R^2$ is hydrogen or a methyl group, and n is an integer from about 4 to about 18,

wherein $R^2$ is hydrogen or a methyl group and m is an integer of from about 12 to about 40, and 3) from 0 to about 30 parts of at least one copolymerized ethylenically unsaturated monomer selected from the group consisting of vinyl esters, acrylic esters, methacrylic esters, styrene, derivatives thereof, and mixtures thereof, a, b and c having a total of 100 parts, and having an average particle size of from about 0.25 μm to about 15 μm and; and c) from 0 to about 20 parts of an antistatic agent selected from the group consisting of cationic agents, anionic agents, fluorinated agents, and nonionic agents.

2. A water-based toner-receptive composition according to claim 1 wherein the ratio of core to shell of said core/shell latex polymer ranges from about 25/75 to about 50/50.

3. A water-based toner-receptive composition according to claim 1 wherein said α,β-ethylenically unsaturated monomer is selected from the group consisting of methyl acrylate, ethyl acrylate, methyl (meth)acrylate, isobutyl (meth) acrylate, isodecyl (meth)acrylate, cyclohexyl (meth) acrylate and n-butyl acrylate, styrene, and vinyl esters.

4. A water-based toner-receptive composition according to claim 1 wherein said bicyclic (meth)acrylate is selected from the group consisting of dicyclopentenyl (meth) acrylate, norbornyl (meth) acrylate, isobornyl (meth) acrylate.

5. A water-based toner-receptive composition according to claim 1 further comprising from 0 to about 20 parts of a polar monomer selected from the group consisting of (meth) acrylic acid, hydroxyalkyl (meth) acrylates; N-alkylacrylamide; N,N-dialkyl amino alkyl (meth) acrylate; monoalkyl amino alkyl (meth)acrylate, the cationic salt of N,N-dialkyl amino alkyl (meth)acrylate, and N-alkyl amino alkyl (meth) acrylate, all of said alkyl groups containing up to about 12 carbon atoms.

6. A water-based toner-receptive composition according to claim 1 further comprising a crosslinker selected from the group consisting of polyfunctional aziridines.

7. A water-based toner-receptive composition according to claim 6 wherein said crosslinker selected from the group consisting of trimethylolpropane-tris-(β-(N-Aziridinyl)propionate), Pentaerythritol-tris-(β-(N-aziridinyl)propionate), trimethylolpropane-tris-(β-(N-methylaziridinyl)propionate), ureaformaldehyde, melamine formaldehyde, isocyanate, multifunctional epoxy polymers, alkyldialkoxy silane, γ-aminopropyl trimethoxysilane, vinyl triethoxy silane, vinyl tris(β-methoxy ethoxy)-silane, vinyl triacetoxy silane, γ-methacryloxypropyltrimethyoxy silane, and γ-(β-amino ethyl)aminopropyl trimethoxysilane.

8. A water-based toner-receptive composition according to claim 1 further comprising a silica particle.

* * * * *

UNITED STATES PATENT AND TRADEMARK OFFICE
CERTIFICATE OF CORRECTION

PATENT NO. : 5,500,457
DATED : March 19, 1996
INVENTOR(S) : Manisha Sarkar and Ying-Yuh Lu It is certified that error appears in the above-indentified patent and that said Letters Patent is hereby corrected as shown below:

Column 13, Line 58, "87.6 gms" should read --2287.6 gms--.

Column 15, Line 59, "4.5 gms" should read --64.5 gms--.

Column 18, Line 21, after "Example" insert --22--.

Column 18, Line 23, after "Example" insert --2--.

Signed and Sealed this

Thirteenth Day of May, 1997

Attest:

BRUCE LEHMAN

*Attesting Officer*  *Commissioner of Patents and Trademarks*